United States Patent [19]

Nash

[11] Patent Number: 4,555,591

[45] Date of Patent: Nov. 26, 1985

[54] INTEGRATED CIRCUIT DEVICES FOR SECURE DATA ENCRYPTION

[75] Inventor: Randy D. Nash, Long Branch, N.J.

[73] Assignee: AT&T Bell Laboratories, Murray Hill, N.J.

[21] Appl. No.: 415,668

[22] Filed: Sep. 7, 1982

[51] Int. Cl.[4] ............................................. A04K 1/02
[52] U.S. Cl. ............................ 178/22.13; 178/22.14; 178/22.09
[58] Field of Search ............ 455/26; 178/22.09, 22.08, 178/22.13, 22.14; 235/487, 488; 340/825.3; 237/379, 380, 382.5, 492

[56] References Cited

U.S. PATENT DOCUMENTS

| | | | |
|---|---|---|---|
| 3,752,920 | 8/1973 | Gemperle | 178/22.13 |
| 4,092,524 | 5/1978 | Moreno | 235/487 |
| 4,105,156 | 8/1978 | Dethloff | 235/487 |
| 4,203,166 | 5/1980 | Ehrsam et al. | 178/22.09 |
| 4,204,113 | 5/1980 | Giraud et al. | 235/488 |
| 4,211,919 | 7/1980 | Ugon | 235/487 |
| 4,223,403 | 9/1980 | Konheim et al. | 178/22.08 |
| 4,249,180 | 2/1981 | Eberle et al. | 178/22.09 |
| 4,256,955 | 3/1981 | Giraud et al. | 235/492 |
| 4,295,041 | 10/1981 | Ugon | 235/488 |
| 4,304,961 | 12/1981 | Campbell, Jr. | 178/22.08 |
| 4,333,074 | 6/1982 | Sutherland et al. | 340/825.3 |
| 4,442,345 | 8/1984 | Mollier et al. | 235/382.5 |
| 4,446,475 | 5/1984 | Gerceki et al. | 235/487 |

OTHER PUBLICATIONS

Motorola Semiconductor Data Sheet–AD1–827–R1 (1980) MC 6859 Data Security Device, pp. 1–10.

Primary Examiner—Salvatore Cangialosi
Attorney, Agent, or Firm—Erwin W. Pfeifle

[57] ABSTRACT

The present invention relates to apparatus for placing digital words or a private key into a register in an integrated circuit in such a manner that it cannot be later read or modified from outside the integrated circuit for purposes of, for example, providing a secure communication system. More particularly, a special key register in the form of an externally programmable read-only-memory which is programmable from external to the integrated circuit is provided. The programmable register contains at least one extra bit which is not part of the private key for enabling the program line through a gating means and entering the private key into the appropriate locations in the register before a predetermined binary code is placed in the at least one extra bit location which disables the gating means and thereafter prevents the changing of the private key in the register.

2 Claims, 1 Drawing Figure

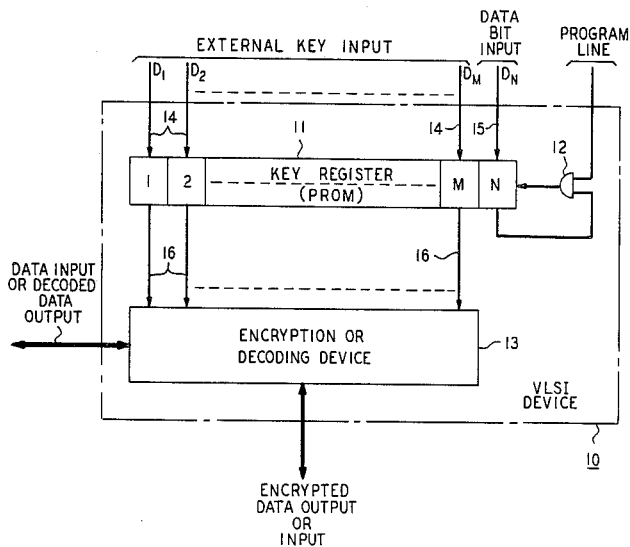

INTEGRATED CIRCUIT DEVICES FOR SECURE DATA ENCRYPTION

BACKGROUND OF THE INVENTION

1. Field of the Invention

The present invention relates to a technique for placing a digital word or private key into an integrated circuit in a manner where it cannot be later read or modified from outside the integrated circuit in order to provide a secure communication system.

2. Description of the Prior Art

The security of data communications has been increasingly important especially where sensitive information is to be transmitted to one or more remote locations over shared lines or channels. Typical of such sensitive information are files, programs and business information of a corporation or possible government communications.

A microcomputer cipher apparatus for secure transmission is disclosed in U.S. Pat. No. 4,249,180 issued to G. Eberle et al on Feb. 3, 1981. The disclosed apparatus includes a microcomputer that controls a cipher process by which sensitive data is encrypted before transmission. As shown in FIG. 6 of the patent and described in the specification, two basic levels of cipher keys are provided by and are stored in a cipher apparatus. As shown in FIG. 6 of Eberle et al, the cipher keys are stored in programmable read only memories (PROMs), and an operator can enter a new key at any time by using an "Enter Key".

Secure encryption for communication is also now available on a single VLSI device as shown on the Motorola Semiconductor Data Sheet for the MC6859 Data Security Device. The MC6859 Data Security Device is a monolithic MOS integrated circuit for use in equipment requiring protection of data. The cryptographic algorithm used by this device is the Data Encryption Standard (DES) as adopted by the U.S. Department of Commerce, National Bureau of Standards. With this device the key is placed into the device when a transmission is to be made. The use of a secondary key is also possible for increased security and the secondary key is transmitted to the remote location in encrypted form.

For these devices, the private key is externally applied. This implies that the key is stored in a ROM or set of switches and is accessible to anyone who can examine the security hardware. The problem remaining in the prior art is to provide a data encryption device or integrated circuit which once the key is entered cannot be read or modified from outside the device or integrated circuit to provide a secure communication system.

SUMMARY OF THE INVENTION

The foregoing problem has been solved in accordance with the present invention which relates to a technique for placing a digital word or private key into an integrated circuit in a manner where it cannot be later read or modified.

It is an aspect of the present invention to provide a technique for placing digital words or a private key into a register in an integrated circuit so that it cannot be later read or modified. More particularly, a special key register is provided in the form of an externally programmable read-only-memory which is programmable from external to the integrated circuit. The programmable register contains an extra bit, which is not part of the private key, to enable the program line through a gating means for burning in the private key. A code in the extra bit disables the gating means thereafter once the key is burned into memory to prevent subsequent access.

Other and further aspects of the present invention will become apparent during the course of the following description and by reference to the accompanying drawings.

BRIEF DESCRIPTION OF THE DRAWING

The FIGURE illustrates a VLSI device including an Externally Programmable Read Only Memory key register which provides secure communication in a secure communication system in accordance with the present invention.

DETAILED DESCRIPTION

In accordance with the present invention, a secure communication system is provided by making a private key, for gaining access to the communication system, inaccessible upon examination of the transmitter or receiver. More particularly, in the FIGURE, secure encryption for communication is achieved on, for example, a Very Large Scale Integrated (VLSI) device 10 by the use of a special key register 11 associated with an AND gate 12 which can be located on the same substrate 10 as an encryption device 13. In the preferred embodiment, key register 11 is an externally programmable read-only-memory (PROM) which is programmable from outside the VLSI device 10.

Programmable register 11 provides storage for M+N bits of information, with storage locations 1 to M being shown for use in storing the M-bit code for the private key to permit access to the secure communication system and storage location N comprising an extra storage location which is not part of the private key where N=1 in the FIGURE. The N-bit code is used to enable the program line initially through gate 12. In operation, PROM register 11 starts with an erase state of a binary "1" for each bit in each storage location. The binary "1" in storage location N of register 11 enables the program line through gate 12. The M bits of the private key are then permanently entered or burned into the appropriate storage locations 1 to M of register 11 over leads 14 after which the extra bit (the N storage location of register 11) is programmed to a binary "0" via lead 15. Once bit N is changed to a binary "0", the program line is disabled through gate 12 and the PROM key register 11 can no longer be read or modified from outside the device 10. In this manner the private key can only be read by the encryption device 13 over leads 16 to provide access to the secure communication system. This private key in register 11 is then used by encryption device 13 to permit a user transmitting such private key to the encryption device to transmit or receive data over a secure communication system.

It is to be understood that the above-described embodiments are simply illustrative of the principles of the invention. Various other modifications and changes may be made by those skilled in the art which will embody the principles of the invention and fall within the spirit and scope thereof. For example, it is to be understood that with the key register 11 and the AND gate 12 being formed on a VLSI device or other integrated circuit, the leads to and from register 11 and gate 12, along with the register and gate, could be encapsulated or made generally inaccessible from outside the device without some form of destruction to prevent access to the key. It is to be further understood that when the device of the FIGURE is used at the transmitting end of the secure communication system, device 13 will be an ecryption device which takes the data input from a user and performs the proper encryption process thereon before transmitting the encrypted data over the system. When device 13 is at the receiver of the secure communication system, the device 13 will generally be an appropriate decoder for converting the received encrypted data from the transmitter into the proper data output signal. Such encryption or decoding will only be performed if the proper M-bit private key word is also provided by the user which is the same as that stored in register 11. It is also to be recognized that the present register 11 and gating means 12 can also be used for purposes other than a secure communication system access and that the N-bit enable code word could comprise more than one bit which is connected to a gating means 12 in a predetermined manner to achieve the same function.

What is claimed is:

1. An integrated device comprising:

an externally programmable read-only-memory register including a plurality of M+N storage locations capable of separately storing both an M-bit unique binary key word and an N-bit enable code word which is used for programming the register, the M+N bits initially including a first binary value; and gating means responsive to the first binary value of the N-bit enable code word initially stored in the N storage locations of the register to enable the register and permit the writing of a uniquely encoded binary key word into the M storage locations of the register followed by an N-bit enable code word including a predetermined second binary value which is capable of both disabling the gating means and preventing the subsequent changing of the M+N bit values.

2. An integrated device according to claim 1 wherein the device further comprises:

a communications device which is connected to the M storage locations of the register and comprises an input and an output data port, the communications device being capable of transmitting data between the input and the output data port in response to an M-bit binary key word being provided to the communications device from outside the integrated device which corresponds to the M-bit binary key word stored in the register.

* * * * *